United States Patent [19]

Otaki et al.

[11] Patent Number: 5,471,250
[45] Date of Patent: Nov. 28, 1995

[54] DIGITAL TIME BASE CORRECTOR WITH DROPOUT COMPENSATING FUNCTION

[75] Inventors: Hiroshi Otaki; Masahiro Nakajima, both of Koufu, Japan

[73] Assignees: Pioneer Video Corporation, Yamanashi; Pioneer Electronic Corp., Tokyo, both of Japan

[21] Appl. No.: 357,861

[22] Filed: Dec. 16, 1994

[30] Foreign Application Priority Data

Dec. 16, 1993 [JP] Japan .................................. 5-316939

[51] Int. Cl.⁶ ............................ H04N 5/94; H04N 5/956; H04N 5/95
[52] U.S. Cl. ........................... 348/498; 358/314; 358/320
[58] Field of Search ................................... 348/498, 497, 348/499, 508, 506, 519, 520, 539, 536, 549, 624; 358/314, 326, 320, 310, 336, 339, 337; 360/36.1, 36.2, 38.1, 34.1; H04N 5/935, 5/932, 5/94, 5/956, 5/95

[56] References Cited

U.S. PATENT DOCUMENTS 4,251,830  2/1981  Tatami .................................. 358/320
4,339,770  7/1982  Dennison et al. ...................... 348/498
4,345,272  8/1982  Shirota .................................. 358/314
4,376,290  3/1983  Shirota .................................. 358/314
4,716,454  12/1987  Oldershaw et al. .................... 358/320

Primary Examiner—Safet Metjahic
Attorney, Agent, or Firm—Sughrue, Mion, Zinn, Macpeak & Seas

[57] ABSTRACT

A digital time base corrector reduces the capacity of a memory to approximately a 1 H of image data while maintains the interleave relationship between a luminance signal and a chrominance signal of a video signal. Polarity data indicating the polarity of a burst signal is generated every 1 H, and a latch circuit is provided for holding and outputting the polarity data during a period of reading image data and polarity data from an image data memory and a sub-carrier phase memory, corresponding to the 1 H in which the polarity data was generated. When dropout occurs in a video signal, the image data and the polarity data are inhibited from being written into the image data memory and the sub-carrier phase memory. When discrepancy is detected between read polarity data and polarity data held in the latch circuit, the color phase of the read image data is inverted.

1 Claim, 9 Drawing Sheets

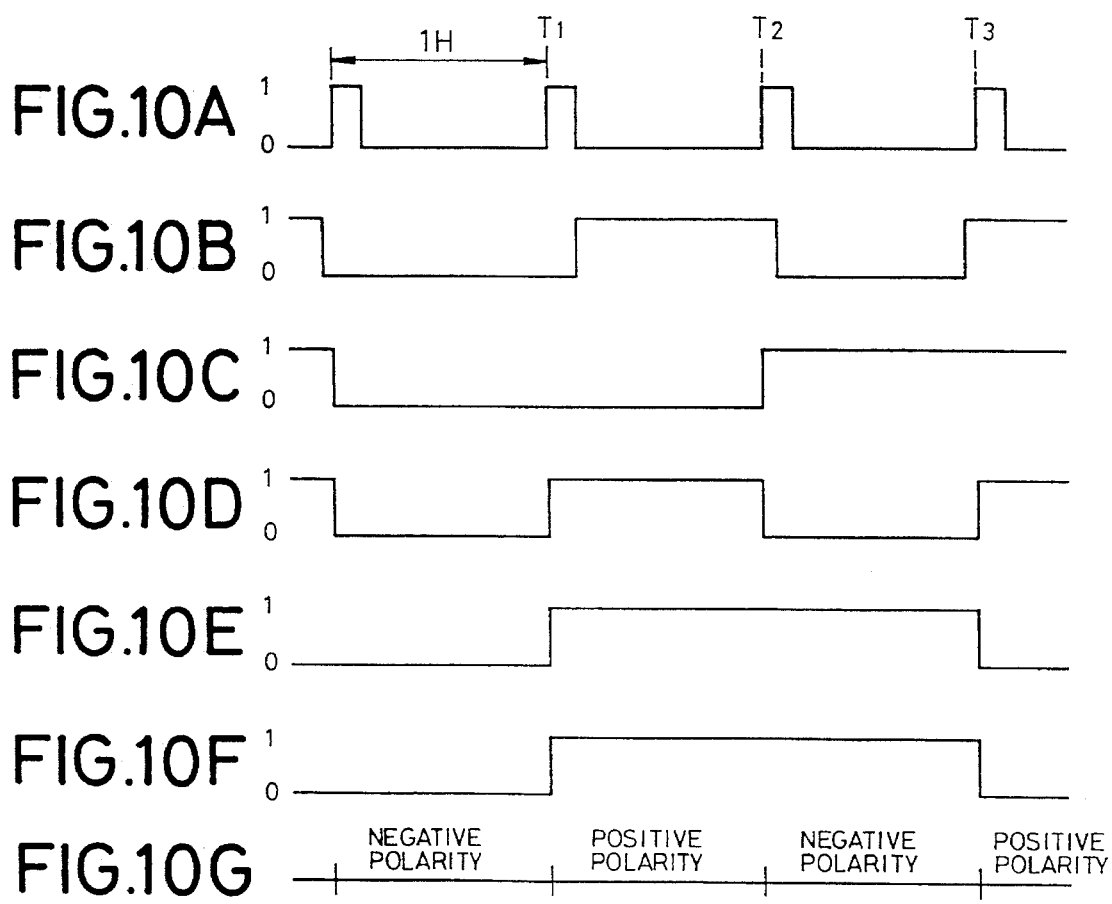

DIGITAL TIME BASE CORRECTOR WITH DROPOUT COMPENSATING FUNCTION

BACKGROUND OF THE INVENTION

1. Field of the Invention

The present invention relates to a time base corrector having dropout compensating function, for use in an apparatus for reproducing a composite video signal recorded on a recording medium.

2. Description of Background Information

When a video signal recorded on a video disc is simply demodulated and reproduced, a reproduced video signal may include fine jitter due to eccentric components of the video disc and vibrations caused in the mechanical system of the apparatus, resulting in a time base error which represents a deviation from a reference time base of the reproduced video signal. For correcting this time base error, a digital time base corrector is known which converts a reproduced video signal to digital data by an A/D convertor, writes the digital data once into a memory, reads out them in the writing order in synchronism with a reference timing signal, and reconverts the read digital data to an analog signal by a D/A convertor.

A conventional time base corrector is disclosed, for example, in Japanese Patent Application Kokai No. 1-93273. In this time base corrector, at least one of a horizontal synchronizing signal and a color burst signal is separated and extracted from a reproduced video signal. A phase locked loop (PLL) circuit is provided for receiving the separated signal. The PLL circuit generates a clock signal, the phase of which is synchronized with a time base error included in the reproduced video signal. The clock signal is phase modulated by a phase modulator means in accordance with a phase comparison-output of a phase comparator means arranged in the PLL circuit. The clock signal, after the phase modulation, serves as a sampling timing signal for the A/D convertor. In this way, the clock signal follows even high frequency components of the time base error, thus making a correction of such time base error.

Some of such time base correctors include a dropout compensating function. For example, as disclosed in Japanese Utility Model Registration Application Kokai No. 3-125577, a dropout detector circuit is provided for detecting dropout in a reproduced video signal, such that a memory write operation is inhibited when dropout is detected, and digital video data which have already been stored in the memory are read out during the period in which the writing operation is inhibited.

In such a conventional digital time base corrector including a dropout compensating function, assume that the memory is provided only with a capacity of storing video signals for 1 H (horizontal scan period). In this case, however, since the phase of a chrominance signal is inverted every 1 H period in the NTSC video signal, the memory must have a capacity of storing image data for at least 2 H in order to maintain the interleave relationship between a luminance signal and a chrominance signal of the video signal. It is nevertheless desirable to reduce the memory capacity for a lower cost.

OBJECTS AND SUMMARY OF THE INVENTION

It is therefore an object of the present invention to provide a digital time base corrector including a dropout compensating function, which is capable of reducing the storing capacity of a memory to approximately a 1 H of image data while maintaining the interleave relationship between a luminance signal and a chrominance signal of a video signal.

The time base corrector of the present invention is characterized by: A/D converting means for sampling a color video signal, which has been read from a recording medium and reproduced, to convert the same to a digital signal; polarity data generating means for generating polarity data indicating the polarity of a burst signal from the digital signal at intervals of one horizontal scan period; an image data memory for storing the digital signal as image data in sample units at intervals of one horizontal scan period; a sub-carrier phase memory having a number of positions for storing the polarity data equal to the number of the image data written into the image data memory; dropout detecting means for generating a dropout detection signal when dropout occurs in the color video signal; memory control means for writing the image data at storing positions in the image data memory sequentially specified in accordance with a write clock signal, phase-synchronized with time base fluctuations included in the color video signal and writing the polarity data into storing positions in the sub-carrier phase memory sequentially specified in accordance with the write clock signal, the memory control means further for reading the image data from storing positions in the image data memory sequentially specified in accordance with a read clock signal having a constant duration and reading the polarity data from storing positions in the sub-carrier phase memory sequentially specified in accordance with the read clock signal, the memory control means in response to the dropout detection signal for inhibiting the image data and the polarity data from being written into the image data memory and the sub-carrier phase memory; latch means for holding and outputting the polarity data generated by the polarity data generating means during a data read operation period of the memory control means corresponding to the horizontal scan period in which the polarity data is generated; discrepancy detecting means for generating a discrepancy detection signal when discrepancy is detected between the polarity data read by the memory control means and polarity data held in the latch means; color phase inverting means for relaying the image data read from the memory control means and, responsive to the discrepancy detection signal for inverting the color phase of the image data read from the memory control means and relaying the image data with the inverted color phase; and means for generating an analog video signal based on the image data output from the color phase inverting means.

In the digital time base corrector according to the present invention, when dropout occurs in a video signal, the image data and polarity data are inhibited from being written into the image data memory and subcarrier phase memory, respectively. At the storing position where writing is inhibited, the image data and polarity data written 1 H before are held as they are, so that discrepancy is present between the read polarity data and appropriate polarity data held in the latch means. Upon detecting the discrepancy, the color phase of the read image data is inverted.

BRIEF DESCRIPTION OF THE DRAWINGS

FIGS. 10A through 10G are diagrams representing the operation of the time base corrector performed when a read position is in advance of a write position in the image data memory.

DETAILED DESCRIPTION OF A PREFERRED EMBODIMENT

An embodiment of the present invention will hereinafter be described in detail with reference to the accompanying drawings.

Figure 1:
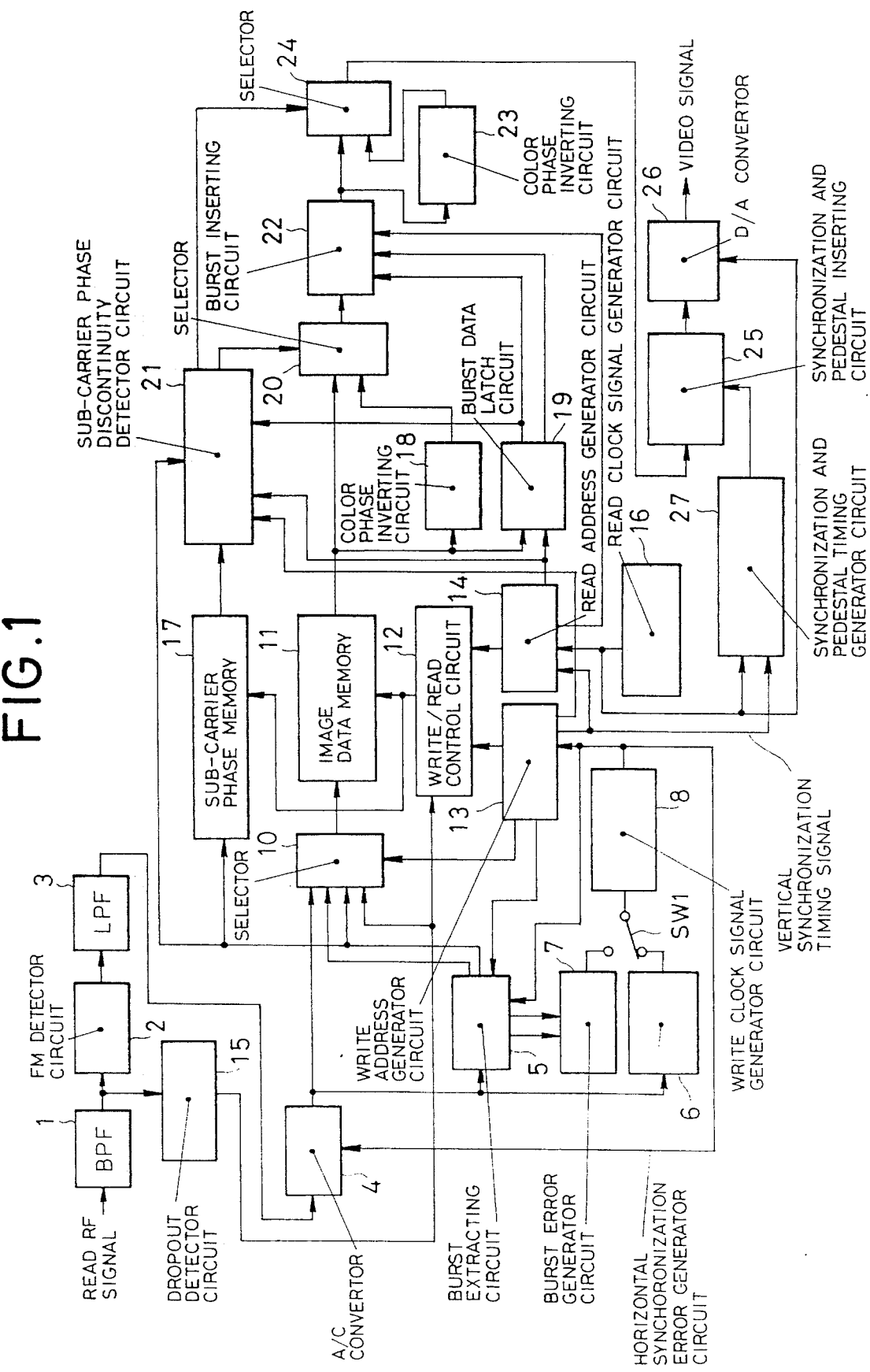
FIG. 1 is a block diagram showing an embodiment of the present invention.
Figure 2:
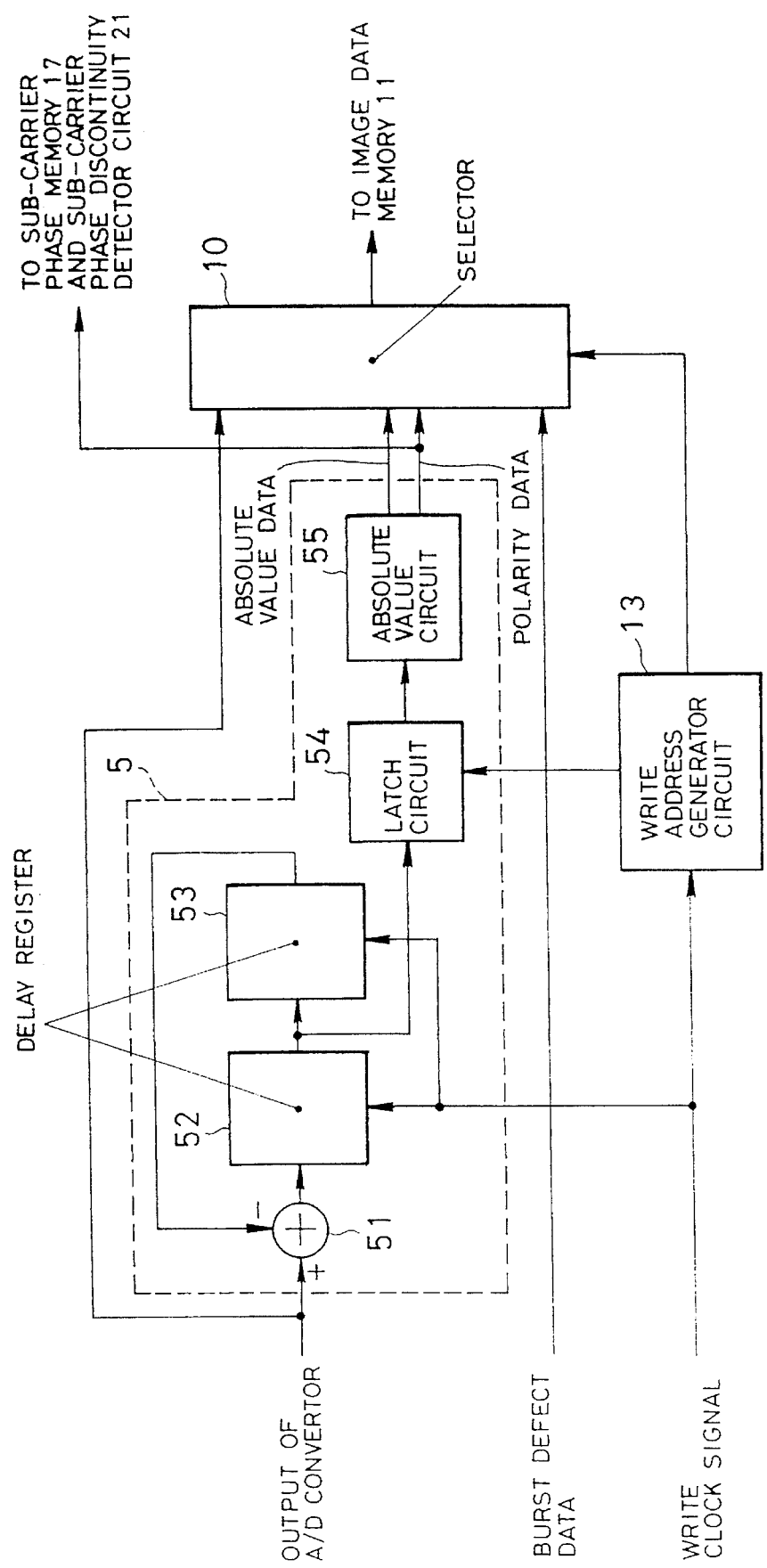
FIG. 2 is a block diagram specifically showing a portion of a burst extracting circuit.

FIG. 1 shows a digital time base corrector according to the present invention. In this digital time base corrector, a read RD signal output from a pickup (not shown) of a video disc player is filtered by a BPF (bandpass filter) 1 to extract only video signal band components which are supplied to an FM detector circuit 2. A composite video signal demodulated in the FM detector circuit 2 is supplied to an A/D convertor 4 through an LPF (low pass filter) 3. The A/D convertor 4 outputs a digital video signal which may be video data for each pixel. The converted output of the A/D convertor 4 is connected to a burst extracting circuit 5 and a horizontal synchronization error generator circuit 6. The burst extracting circuit 5 has a configuration for delivering color burst signal components in a digital video signal output from the A/C convertor 4 as a SIN (sine) component signal and a COS (cosine) component signal, and for deriving the polarity and an absolute value of the amplitude of the burst signal from the COS component signal. In the burst extracting circuit 5, a subtractor 51 is arranged at the output of the A/D convertor 4 for deriving the polarity and an absolute value of the amplitude of the burst signal, as shown in FIG. 2. The subtractor 51 receives the digital video signal output from the A/D convertor 4 at one positive (+) input. An output signal of the subtractor 51 is fed back to the other negative (−) input thereof through two delay registers 52, 53. The delay registers 52, 53 are each supplied with a write clock signal such that a digital video signal is delayed thereby by two sample portions. The output of the delay register 52 is connected to a latch circuit 54. The latch circuit 54 holds a sample of the burst signal at a predetermined position in 1 H (horizontal scan period) of the video signal in response to a burst timing signal, and supplies the held sample to an absolute value circuit 55. The absolute value circuit 55 derives the polarity and an absolute value of the amplitude of the burst signal from the data held in the latch circuit 54. The burst signal is held in the latch circuit 54 as data having a predetermined number of bits, wherein the MSB (most significant bit) thereof represents polarity data, and the lower remaining bits represent absolute value data.

The SIN component signal and the COS component signal output from the burst extracting circuit 5 are supplied to a burst error generator circuit 7. The burst error generator circuit 7 divides the SIN component signal by the COS component signal to calculate a TAN component signal, retrieves an angle component representing a burst error signal from the TAN component signal from a predetermined table stored in a memory (not shown), and outputs the retrieved angle component.

The horizontal synchronization error generator circuit 6 separates and extracts a horizontal synchronization signal component in the digital video signal output from the A/D convertor 4, and calculates a horizontal synchronization error signal from the separated and extracted horizontal synchronization signal component by an error calculating circuit including a loop circuit forming a PLL.

The respective outputs of the horizontal synchronization error generator circuit 6 and the burst error generator circuit 7 are connected to a change-over switch SW1. The change-over switch SW1 selectively relays one of the burst error signal and the horizontal synchronization error signal in response to a switching signal from a switching control circuit, later described, to a write clock signal generator circuit 8. For example, if the time base corrector remains for 3 H or more in a condition that a tracking servo loop is in a closed state and the loop circuit in the horizontal synchronization error generator circuit 6 is locked, an output signal of the burst error generator circuit 7 is relayed to the clock signal generator circuit 8. The write clock signal generator circuit 8 includes a PLL circuit and generates a write clock signal in response to the horizontal synchronization error signal or the burst error signal. The write clock signal is supplied to the A/D convertor 4 and a write address generator circuit 13, later described.

An image data memory 11 is connected to the output of the A/D convertor 4 through a selector 10. The image data memory 11 employs the FIFO (First In First OUT) scheme, and has storing positions for accommodating video data of 768 pixels which are less than 910 pixels included in 1 H. Data write and read to and from the image data memory 11 is controlled by a write/read control circuit 12. The write/ read control circuit 12 is connected to a write address generator circuit 13 for generating write address data for specifying a storing position into which data is to be written, and a read address generator circuit 14 for generating read address data for specifying a storing position from which data is to be read.

An output terminal of the BPF 1 is connected to a dropout detector circuit 15 for detecting dropout. A detection output of the dropout detector circuit 15 is supplied to the selector 10 and the write/read control circuit 12. The selector 10 is supplied with polarity data and absolute value data from the latch circuit 54, in addition to the digital video signal from the A/D convertor 4 and a dropout detection output. The dropout detection output is supplied as burst defect data which is a dropout detection signal for the burst signal. The selector 10 selectively relays one of video data and burst compression data including the burst defect data, polarity data, and absolute value data to the image data memory 11 in response to a selection timing signal.

The polarity data output of the latch circuit 54 is connected to a sub-carrier phase memory 17. The sub-carrier phase memory 17, which has the same number (for example, 768) of storing positions for storing polarity data as the number of storing positions for video data in the image data memory 11, is controlled its writing and reading operations by the write/read control circuit 12. The image data memory 11 and the sub-carrier phase memory 17 have the storing positions corresponding to each other, such that when write address data is generated by the write address generator circuit 13, storing positions in the image data memory 11 and the sub-carrier phase memory 17 corresponding to each other are specified by the write address data. Similarly, when read address data is generated by the read address generator circuit 14, storing positions in the image data memory 11 and the sub-carrier phase memory 17 corresponding to each other are specified by the read address data.

Figure 3:
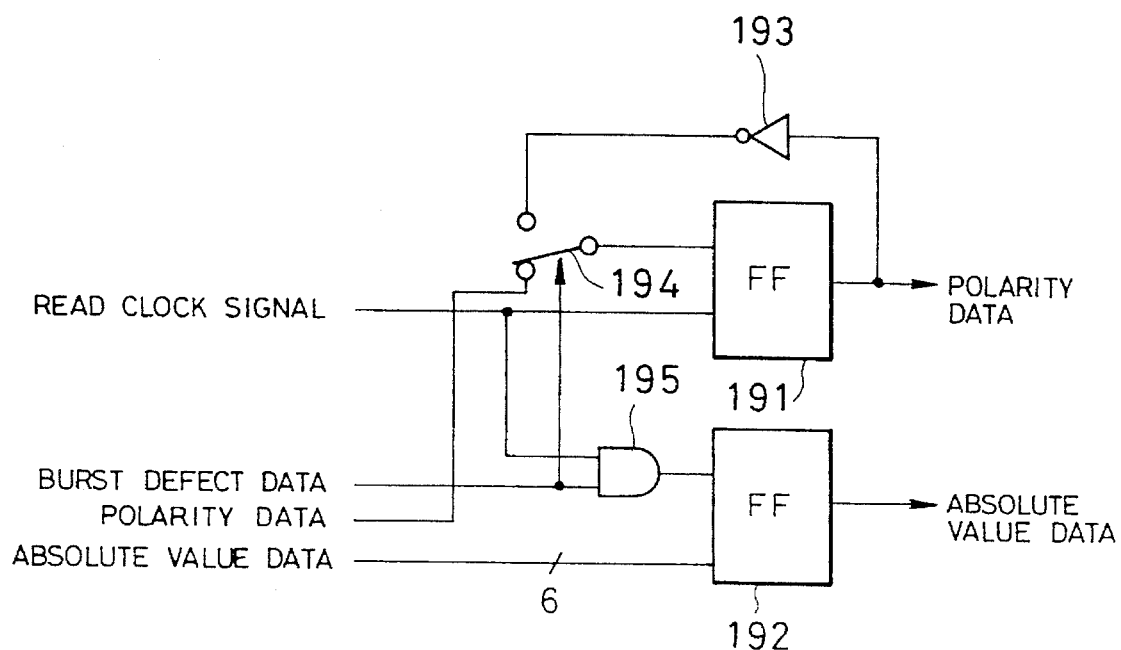
FIG. 3 is a block diagram specifically showing a burst data latch circuit.

The read output of the image data memory 11 is connected to a color phase invertor circuit 18, a burst data latch circuit 19 and a selector 20. The color phase invertor circuit 18 inverts the color phase of video data read from the video data memory 11 and supplies the color phase inverted video data to the selector 20. The burst data latch circuit 19 holds polarity data and absolute value data read from the image data memory 11. As shown in FIG. 3, the burst data latch circuit 19 includes flip-flop (FF) 191, FF 192 as latch elements. One input terminal of the FF 191 is supplied with a read 1 H clock signal from the read address generator circuit 14 as a latch timing signal, while the other input terminal thereof is selectively supplied with the polarity data read from the image data memory 11 or the polarity data output from the FF 191 and inverted by the invertor 193. The change-over switch 194 performs a switching operation in accordance with the contents of the burst defect data read from the image data memory 11. One input of the FF 192 is connected to an AND circuit 195. The AND circuit 195 takes a logical AND of a read 1 H clock signal and the read burst defect data, and supplies the result to the FF 192 as a latch timing signal. The FF 192 is supplied at the other input terminal with absolute value data read from the image data memory 11. Output data of the FF 191 represents the polarity data, while output data of the FF 192 represents the absolute value data.

Figure 4:
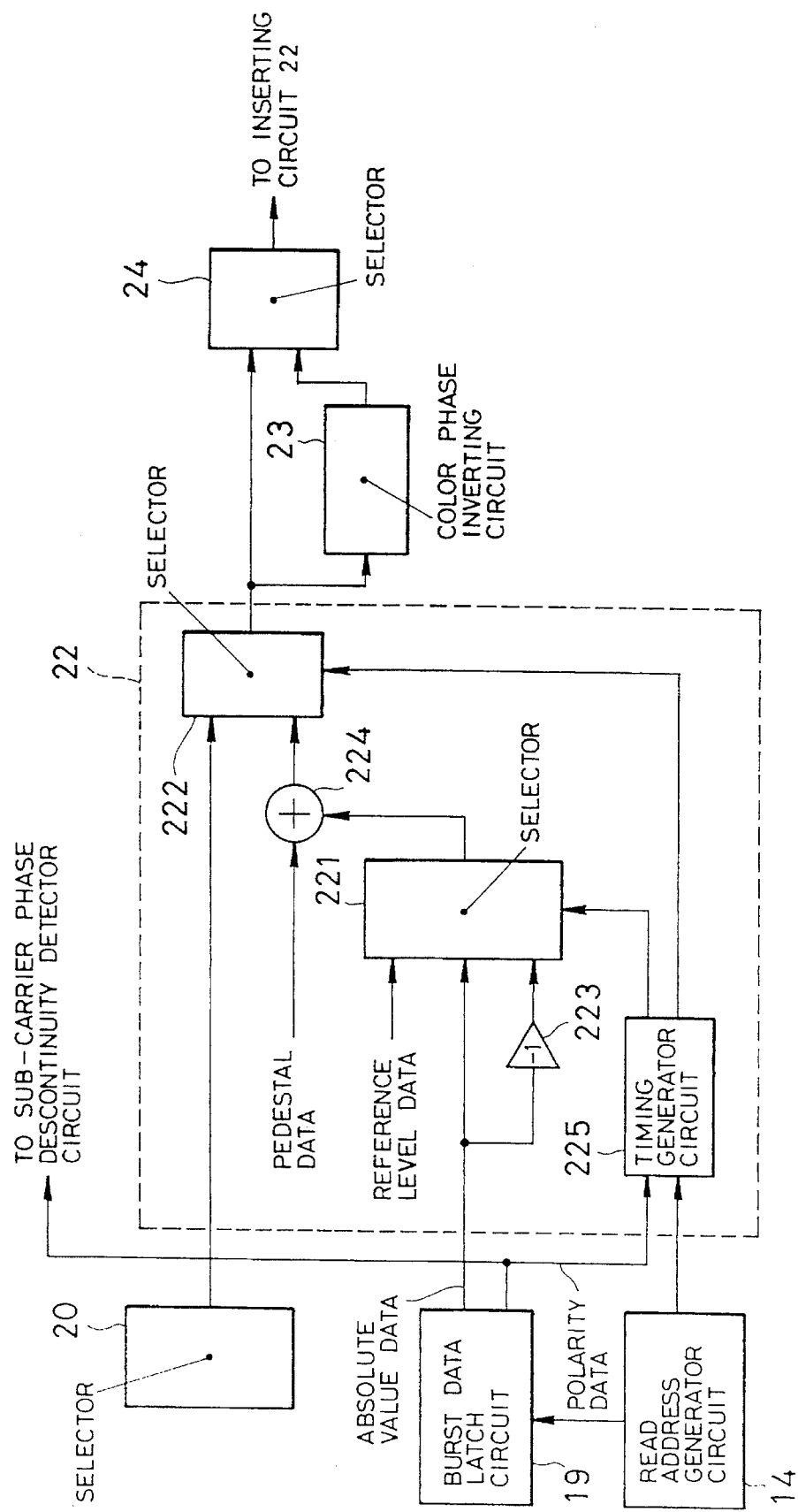
FIG. 4 is a block diagram specifically showing a burst inserting circuit.
Figure 5:
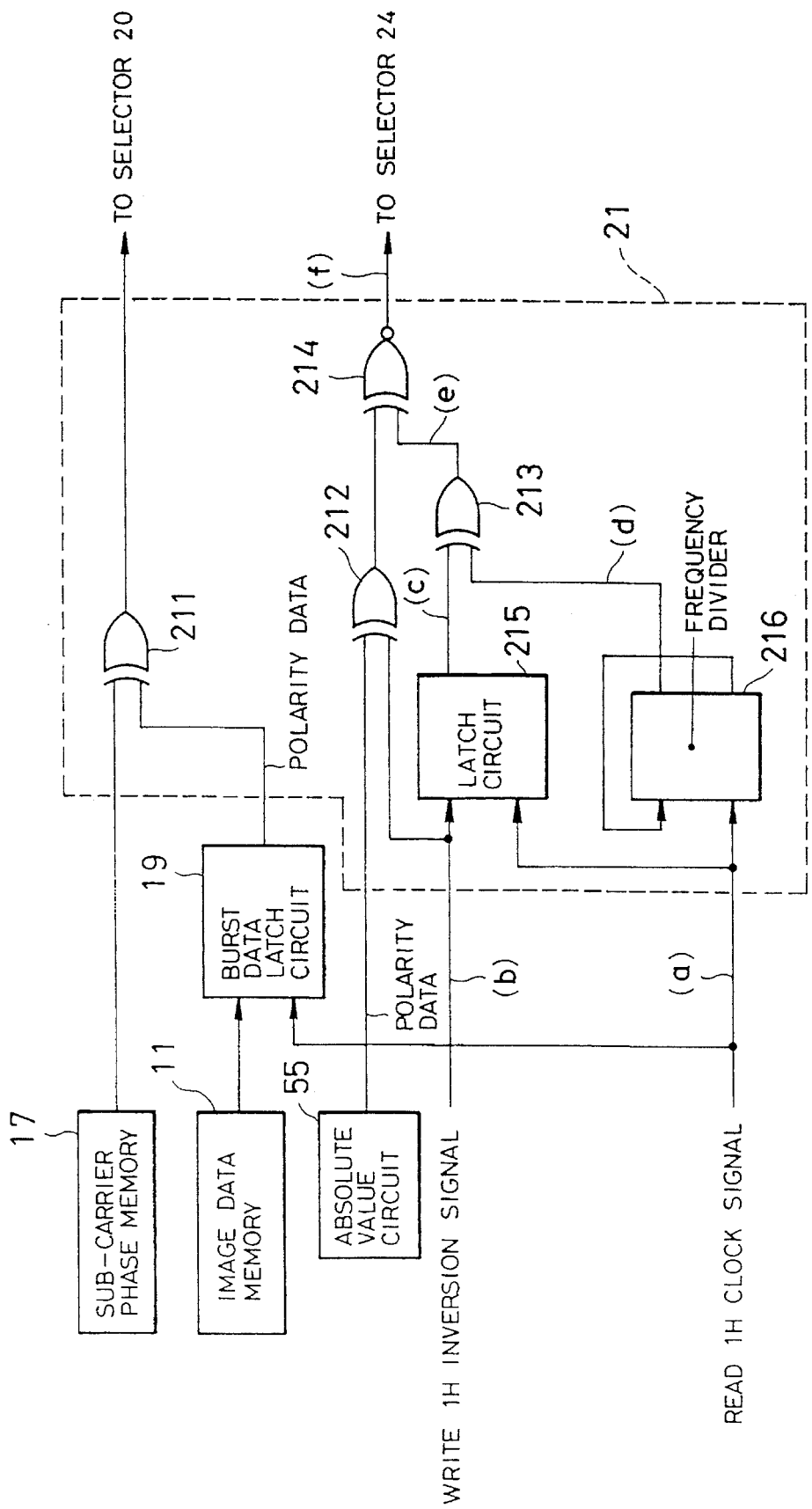
FIG. 5 is a block diagram specifically showing a sub-carrier phase discontinuity detector circuit.

Referring next to FIG. 4, the selector 20 selectively relays and outputs one of the video data read from the image data memory 11 and the video data with inverted color phase from the color phase inverting circuit 18. A selection signal for the selector 20 is supplied from a sub-carrier phase discontinuity detector circuit 21, later described.

At the outputs of the burst data latch circuit 19 and the selector 20, a burst inserting circuit 22 is provided for inserting a burst component into video data. The burst inserting circuit 22 includes two selectors 221, 222, as shown in FIG. 4. The selector 221 selectively relays one of the absolute value data held in the burst data latch circuit 19, output data of a multiplier 223 for multiplying the absolute value data with −1, and reference level data indicative of a zero level, and outputs selected data to an adder 224. The adder 224 adds pedestal data indicative of a pedestal level to data output from the selector 221, and supplies this to the selector 222 as burst data. The selector 222 selectively relays and outputs the video data from the selector 20 or the burst data from the adder 224. The burst inserting circuit 22 includes a timing generator circuit 225 for controlling the selection timing of the respective selectors 221, 222. The timing generator circuit 225 generates a first selection timing signal for the selector 221 based on a count value output from the read address generator circuit 14 and the polarity data held in the burst data latch circuit 19, and a second selection timing signal for the selector 222 based on the read clock signal output from the read address generator circuit 14.

The output of the selector 222, which is the output of the burst inserting circuit 22, is connected to the color phase inverting circuit 23 and a selector 24. The color phase inverting circuit 23 inverts the color phase of video data including the burst component relayed and output from the selector 222, and supplies the selector 24 with the color phase inverted video data. The selector 24 selectively relays and outputs one of the video data including the burst component relayed and output from the selector 222 and the color phase inverted video data from the color phase inverting circuit 23. A selection signal for the selector 24 is supplied from the sub-carrier phase discontinuity detector circuit 21.

Referring back to FIG. 1, the output of the selector 24 is connected to a D/A convertor 26 through a synchronization and pedestal inserting circuit 25. The synchronization and pedestal inserting circuit 25 adds horizontal and vertical synchronization components and a pedestal component to the video data including the burst data output from the selector 24 to generate a digital composite video signal. The timings at which the horizontal and vertical synchronization components and the pedestal component are added are controlled by a synchronization and pedestal timing generator circuit 27°. The timing generator circuit 27 is supplied with a vertical synchronization timing signal from the write address generator circuit 13 and a horizontal synchronization timing signal from the read address generator circuit 14. The D/A convertor 26 converts the digital composite video signal to an analog composite video signal.

The sub-carrier phase discontinuity detector circuit 21 includes three EX-OR circuits 211 through 213; an EX-NOR circuit 214; a latch circuit 215; and a frequency divider 216. The EX-OR circuit 211 takes logical exclusive OR of the polarity data output from the sub-carrier phase memory 17 and the polarity data held in the burst data latch circuit 19 to determine whether or not the polarity data coincide with each other. An output signal of the EX-OR circuit 211 serves as a selection signal for the selector 20, and commands the selector 20 to select the video data read from the image data memory 11 when the polarity data coincide, and the color phase inverted video data from the color phase inverting circuit 18 when the polarity data do not coincide.

The EX-OR circuit 212 takes logical exclusive OR of the polarity data derived by the absolute value circuit 55 and a write 1 H inversion signal generated from the write address generator circuit 13. An output signal of the EX-OR circuit 212 is supplied to one input of the EX-NOR circuit 214. The latch circuit 215 holds the level of the write 1 H inversion signal generated from the write address generator circuit 13 at a leading edge of the read 1 H clock signal generated from the read address generator circuit 14. The frequency divider 216 divides the read 1 H clock signal by two to generate a read 1 H inversion signal. The EX-OR circuit 213 takes logical exclusive OR of the level held by the latch circuit 215 and the read 1 H inversion signal. Further, the EX-NOR circuit 214 negatively takes logical exclusive OR of respective output signals of the EX-OR circuits 212, 213.

The write address generator circuit 13 has a counter (not shown) for counting the write clock signal. This counter is reset in response to a vertical synchronization timing signal separated from a video signal in a synchronization separating circuit, not shown, and repetitively counts, for example, up to 910 and outputs the count value as write address data. Also, the write address generator circuit 13 generates the write 1 H inversion signal, burst timing signal to the latch circuit 54, selection timing signal to the selector 10, and vertical synchronization timing signal to the timing generator circuit 27 based on a count value of the counter. The read address generator circuit 14 in turn has a counter (not shown) for counting a constant read clock signal generated from a read clock signal generator circuit 16. This counter is also reset in response to the vertical synchronization timing signal, similarly to the counter of the write address generator circuit, and repetitively counts, for example, up to 910 and outputs the count value as read address data. The read address generator circuit 14 also generates a read 1 H clock signal to the latch circuit 19 and the sub-carrier phase discontinuity detector circuit 21 based on the count value of the counter.

Figure 6A:
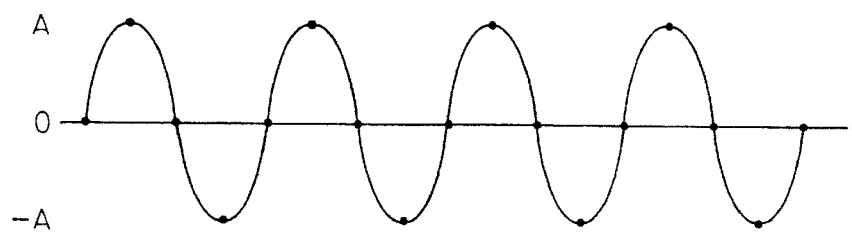
FIGS. 6A and 6B are charts respectively showing a waveform of a color burst signal component having two polarities.
Figure 6B:
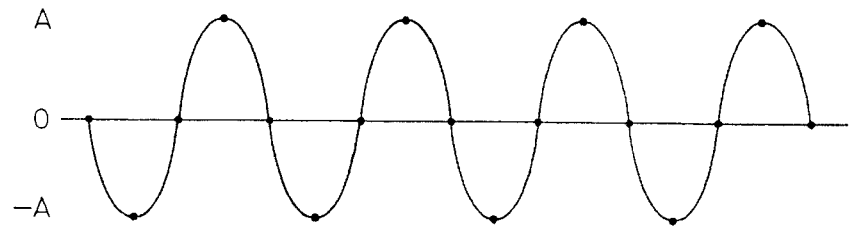

In the configuration described above, a composite video signal demodulated by the FM detector circuit 2 is supplied to the A/D convertor 4 through the LPF 3, and an 8-bit digital video signal is supplied to the burst extracting circuit 5 and the selector 10 from the A/D convertor 4. In the burst extracting circuit 5, a burst signal in a video signal is accumulated by a predetermined period portion in the sampling order by the subtractor 51 and the two delay registers 52, 53. The subtractor 51 and the delay registers 52, 53 have a 10-bit signed configuration. Sampled values of the burst signal are supplied to the subtractor 51 in a sequence of 0, A, 0, −A, 0, A, 0, . . . , in one polarity as shown in FIG. 6A, while in a sequence of 0, −A, 0, A, 0, −A, 0, . . . , in the other polarity as shown in FIG. 6B. Note that in FIGS. 6A, 6B, black points indicate sampling points, and A designates an amplitude level. The accumulation results indicate −8A in one polarity and 8A in the other polarity. Then, 1-bit sign data (polarity data) and 9-bit amplitude accumulation data are held in the latch circuit 54 in response to the burst timing signal at the time four cycles of the burst signal are accumulated. In the absolute value circuit 55, the 9-bit amplitude accumulation data is divided by eight, and lower three bits are removed to derive a 6-bit average amplitude data which consists of the most significant bit indicating the polarity data and the lower six bits indicating the absolute value data. Here, since the amplitude of the burst signal is small in comparison with other signal components, it can be expressed sufficiently with six bits.

Figure 7:
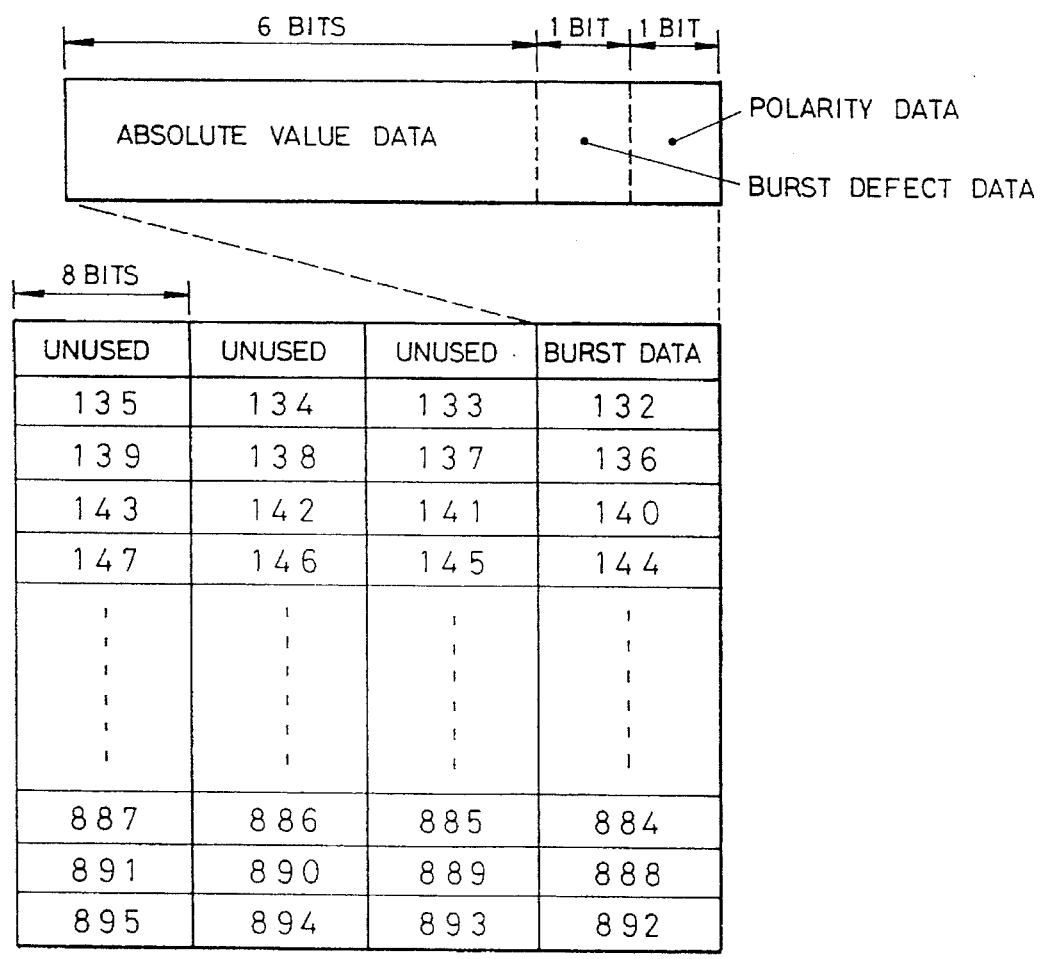
FIG. 7 is a diagram showing the contents stored in an image data memory.

The selector 10 relays the data related to the burst signal in the order of the absolute value data, the polarity data and the burst defect data at intervals of 1 H in response to the selection timing signal and outputs the relayed data to the image data memory 11, and relays video data from the A/D convertor 4 and outputs the same to the image data memory 11 during the remaining period of 1 H. Written into the image data memory 11 is data supplied from the selector 10 in accordance with a write signal from the write/read control circuit 12. A write position in the image data memory 11 is specified by write address data generated from the write address generator circuit 13o For image data, data representing 132th to 895th pixels, actually forming a screen portion, are written into the image data memory 11. Therefore, each data is written into the image data memory 11 as shown in FIG. 7. In FIG. 7, values in the table indicate pixel numbers. When the image data on the 132th pixel to the 895th pixel are written, the polarity data held in the absolute data circuit 55 is written into sequentially specified storing positions in the sub-carrier phase memory 17 in response to the write signal from the write/read control circuit 12.

Also, for the image data memory 11 and the sub-carrier phase memory 17, read addresses are sequentially specified in response to a read signal from the write/read control circuit 12, and data are read from respective addresses of the memories 11 and 17. In the image data memory 11, the absolute value data, the polarity data and the burst defect data are first read at intervals of 1 H, and then the video data from the 132th pixel to the 895th pixel are read one by one. In the sub-carrier phase memory 17, the polarity data is sequentially read out in synchronism with the reading of the video data.

The absolute value data, polarity data and burst defect data read from the image data memory 11 are supplied to the burst data latch circuit 19. If the burst defect data does not indicate the occurrence of dropout in a burst signal, the absolute value data and polarity data are held in the FF 192, 191, respectively, in the burst data latch circuit 19. The held absolute value data is supplied directly to the selector 221 as well as to the selector 221 through a multiplier 223. Thus, the selector 221 is supplied with a reference level data indicating a zero level together with the absolute value data read from the image data memory 11 and negative data having the value equal to the absolute value data. The polarity data held in the latch circuit 19 is supplied to the timing generator circuit 225. The timing generator circuit 225 generates a first selection timing signal for changing the selection order of the selector 221 in accordance with the polarity indicated by the polarity data at the timing synchronized with the read clock signal. With one polarity shown in FIG. 6A, the selector 221 is controlled to change the switching order such as 0, A, 0, −A, 0, A, 0, . . . , while with the other polarity shown in FIG. 6B, the selector is controlled to change the switching order such as 0, −A, 0, A, 0, −A, 0, . . . . Data output from the selector 221 is added to pedestal data by the adder 224, and then supplied to the selector 222 as burst data.

The video data read from the image data memory 11 is supplied to the selector 222 through the selector 20. In the selector 222, the burst data or the image data is relayed in accordance with a second selection timing signal from the timing generator circuit 225. More specifically, the burst data from the adder 224 is relayed and output corresponding to the position in 1 H at which the burst signal exists, and the image data is relayed and output corresponding to the positions in 1 H at which video data from the 132th to the 895th pixels exist. In this way, the image data including the burst component relayed from the selector 222 are supplied to the synchronization signal and pedestal level inserting circuit 25 through the selector 24. The synchronization and pedestal inserting circuit 25 adds horizontal and vertical synchronization components and pedestal component to the video data including the burst component to generate a digital composite video signal. The digital composite video signal is converted to an analog composite video signal by the D/A convertor 26, and supplied to a television receiver (not shown).

The operations described above are performed when no dropout occurs in demodulated video signals. On the other hand, if the dropout detector circuit 15 detects dropout from a demodulated video signal, a dropout detection signal is supplied from the dropout detector circuit 15 to the write/read control circuit 12. The write/read control circuit 12, responsive to the dropout detection signal, inhibits a write operation to the image data memory 11 and the sub-carrier phase memory 17. Video data is not written into a storing position specified at that time in the video data memory 11, and instead video data already written is held in the storing position. Also, the polarity data is not written into a storing position specified at that time in the sub-carrier phase memory 17, and instead the polarity data already written is held in the storing position. Stated another way, since video data and polarity data written 1 H before have been stored in the storing positions specified by the write address data, these video data and polarity data written 1 H before are maintained therein as they are during the dropout period.

Figure 8A:
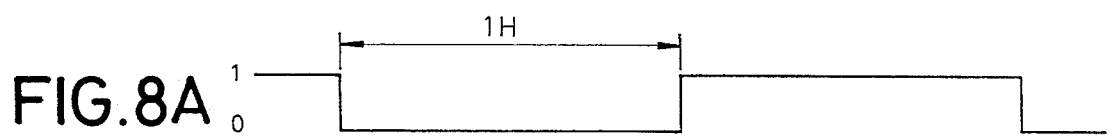
FIGS. 8A, 8B and 8C are waveform charts representing the operation performed when dropout occurs.
Figure 8B:
Figure 8C:

The polarity data output from the absolute value circuit 55 is inverted every 1 H as shown in FIG. 8A, and the polarity data thus changed is written into the video data memory 11 as one of data related to the burst signal. During 1 H, the same polarity data output from the absolute value circuit 55 is written into the sub-carrier phase memory 17 in synchronism with the write clock signal. FIG. 8B sequentially shows the polarity data written into the sub-carrier phase memory 17 in the address order. However, if the dropout detection signal is generated from the dropout detector circuit 15 as indicated by D/O in FIG. 8C, the writing operation is inhibited by the write/read control circuit 12, with the result that data written 1 H before is maintained in a storing position specified by the write address data at the time the writing operation is inhibited.

Since the polarity data held in the burst data latch circuit 19 and the polarity data sequentially read from the sub-carrier phase memory 17 are all coincident during 1 H wherein no dropout detection signal is generated, a low level signal is generated from the EX-OR circuit 211. The low level signal causes the selector 20 to relay the image data read from the image data memory 11. On the other hand, during 1 H wherein a dropout detection signal is generated, the polarity data held in the burst data latch circuit 19 does not coincide with the polarity data sequentially read from the sub-carrier phase memory 17. When both the polarity data do not coincide, a high level signal is generated from the EX-OR circuit 211 to cause the selector 20 to relay the color phase inverted video data from the color phase inverting circuit 18. Thus, in a portion in which dropout has occurred, video data written 1 H before is read from the image data memory 11, subjected to the phase inversion by 180°, and is output with the phase inverted by 180°, thus maintaining the condition imposed to the chrominance signal that the phase is inverted every 1 H.

When dropout has occurred in a burst signal, the burst defect data, indicating the occurrence of the dropout, is written into the image data memory 11. The burst defect data is at "1" when no dropout occurs in a burst signal and at "0" when dropout occurs in a burst signal. When the absolute value data, polarity data and burst defect data are read from the image data memory 11, the read polarity data and absolute value data are not held in the FF 191, 192 in the burst data latch circuit 19, respectively, if the read burst defect data is at "0". In this case, the FF 192 holds the absolute value data written 1 H before and so far held therein, as it is. Since the change-over switch 194 relays output data of the invertor 192 to one input terminal of the FF 191 in response to the burst defect data, the FF 191 holds and outputs an the polarity data written thereinto 1 H before with the opposite phase. Thus, since the burst inserting circuit 22 is supplied with the absolute value data written 1 H before and the polarity data presenting the phase opposite to that of 1 H before, the burst data output from the adder 224 satisfies the condition that the phase is inverted every 1 H, and an appropriate amplitude is presented.

Figure 9A:
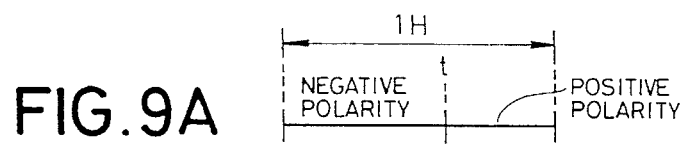
FIGS. 9A, 9B and 9C are diagrams representing the operation of the time base corrector performed when a read position is in advance of a write position in the image data memory.
Figure 9B:
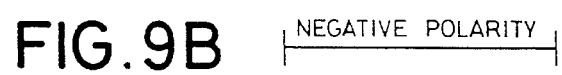
Figure 9C:
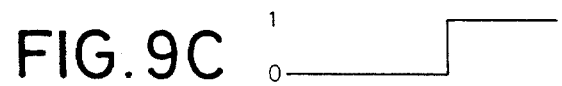

Incidentally, while the write clock signal suffers from fluctuations in frequency due to jitter included in demodulated video signals, the read clock signal has a constant cycle, so that a read position may pass a write position in the image data memory 11 and the sub-carrier phase memory 17. If a write position is in advance of a read position in the course of 1 H, the polarity data read from the sub-carrier phase memory 17 is data of the previous line (horizontal scan line). For example, the polarity indicated by the polarity data is inverted at the time t at which the read position passes the write position, as shown in FIG. 9A. The polarity data is different from the polarity data of the current line held in the burst data latch circuit 19 (FIG. 9B). Thus, since a high level signal is generated from the EX-OR circuit 211 as shown in FIG. 9C, as the case of dropout, color phase inverted video data from the color phase inverting circuit 18 is supplied to the synchronization signal and pedestal level inserting circuit 25 through the selector 20, 222 and 24. In this way, in a portion wherein the read position passes the write position in the course of 1 H, video data written 1 H before is read from the image data memory 11, its phase is inverted by 180., and the phase inverted video data is output, thus maintaining the condition imposed to the chrominance signal that the phase is inverted every 1 H.

If the reading system reads video data for the next line while the read position is in advance of the write position, the read 1 H clock signal is generated before the polarity data in the image data memory 11 is rewritten. Therefore, the polarity data held in the burst data latch circuit 19 in response to the read 1 H clock signal is the same as that of the previous line. The burst data from the adder 224 of the burst inserting circuit 22 is generated as the data identical to that of the previous line, without inverting the phase. Further, the polarity data read from the sub-carrier phase memory 17 is also the data of the previous line, because it is read before new polarity data is written thereinto. Thus, a low level signal is generated from the EX-OR circuit 211 to cause the selector 20 to relay image data read from the image data memory 11 to the selector 222. As a result, if the reading system performs a read operation for scanning the next line in a condition that the read position is in advance of the write position, image data including a burst component, without the phase of the sub-carrier being inverted, is relayed from the selector 222.

To cope with this inconvenience, the digital base corrector of this embodiment operates in the following manner. The latch circuit 215 holds the level of the write 1 H inversion signal in response to a rising edge of the read 1 H clock signal. The read 1 H clock signal is a pulse signal having a constant duration, as shown in FIG. 10A, while the write 1 H inversion signal is a signal which has the level inverted every 1 H and a length of 1 H varied due to jitter components. Therefore, in a condition that the write position is in advance of the read position, the time at which the read 1 H clock signal rises is immediately after the level of the write 1 H inversion signal is inverted. Contrarily, in a condition that the read position is in advance of the write position, the level of the write 1 H inversion signal has not been inverted at the time T1 at which the read 1 H clock signal has risen, as shown in FIG. 10, whereby the latch circuit 215 holds the same level as that at the time the read 1 H clock signal rose at the previous time. Since the level of the read 1 H inversion signal generated from the frequency divider 216 is inverted at a time T1, as shown in FIG. 10D, two input levels at the EX-0R circuit 213 are different from each other. At the time T1, the EX-OR circuit 213 generates a high level signal, as shown in FIG. 10E, which is supplied to one input of the EX-NOR circuit 214. If the phase of the sub-carrier of a demodulated video signal is inverted every 1 H in the EX-OR circuit 212 which supplies a signal to the other input of the EX-NOR circuit 214, the levels of the polarity data from the absolute value circuit 55 and the write 1 H inversion signal, which are respectively input to the EX-NOR circuit 214, are coincident, whereby a low level signal is generated. Then, the output of the EX-NOR circuit 214 goes high at the time T1, as shown in FIG. 10F. This high level causes the selector 24 to relay and output the output signal of the color phase inverting circuit 23. Since the image data including the burst component undergoes the phase inversion by the color phase inverting circuit 23, the every 1 H phase inverting condition is maintained for the chrominance signal, for example, as shown in FIG. 10G, even if the reading system reads video data for the next line in the condition that the read position is in advance of the write position.

Also, when the reading system enters a video data read operation for the next line at the time T2 shown in FIG. 10 in the condition that the read position is in advance of the write position, the output of the EX-NOR circuit 214 goes high by the foregoing operation, so that the selector 24 relays and outputs the output signal of the color phase inverting circuit 23, and the video data including the burst component relayed from the selector 222 undergoes the phase inversion by the color phase inverting circuit 23.

Also, at a time T3 shown in FIG. 10, the reading system is reading video data for the next line in the original condition that the write position is in advance OF the read position, so that the selector 24 relays and outputs the output signal of the burst inserting circuit 22, and the video data including the burst component, relayed from the selector 222, is output from the D/A convertor 26 as a reproduced video signal, after the synchronization and pedestal components are added thereto.

It should be noted that while the image data memory 11 and the sub-carrier phase memory 17 are individually provided in the foregoing embodiment, it is apparent that these memories may be arranged as a single memory. Also, while the burst data such as the polarity data generated by the burst extracting circuit 5 is written into the image data memory 11, they may be written into another memory.

As described above, in the digital time base corrector of the present invention, the polarity data indicating the polarity of a burst signal is generated every one horizontal scan period, and a latch means is provided for holding and outputting the polarity data during a period of reading image data and polarity data from an image data memory and a sub-carrier phase memory, corresponding to the horizontal scan period in which the polarity data is generated. When dropout occurs in a video signal, the image data and the polarity data are inhibited from being written into the image data memory and the sub-carrier phase memory, respectively. If discrepancy is detected between read polarity data and appropriate polarity data held in the latch means, the color phase of read image data is inverted. Since in a portion where dropout has occurred, the image data are replaced with those written into the image data memory 1 H before and having the inverted color phase, the storing capacity of the memory can be reduced to approximately a 1 H of video data while maintaining the interleave relationship between the luminance signal and chrominance signal of a video signal, thus achieving cost reduction.

What is claimed is:

1. A digital time base corrector comprising:

A/D converting means for sampling a color video signal, which has been read from a recording medium and reproduced, to convert said color video signal to a digital signal;

polarity data generating means for generating polarity data indicating the polarity of a burst signal from said digital signal at intervals of one horizontal scan period;

an image data memory for storing said digital signal as image data in sample units at intervals of one horizontal scan period;

a sub-carrier phase memory having a number of positions, for storing said polarity data, equal to the number of said image data sample units written into said image data memory;

dropout detecting means for generating a dropout detection signal when dropout occurs in said color video signal;

memory control means for writing said image data at storing positions in said image data memory sequentially specified in accordance with a write clock signal, phase-synchronized with time base fluctuations included in said color video signal and writing said polarity data into storing positions in said sub-carrier phase memory sequentially specified in accordance with said write clock signal, said memory control means further for reading said image data from storing positions in said image data memory sequentially specified in accordance with a read clock signal having a constant duration and reading said polarity data from storing positions in said sub-carrier phase memory sequentially specified in accordance with said read clock signal, said memory control means in response to said dropout detection signal for inhibiting said image data and said polarity data from being written into said image data memory and said sub-carrier phase memory;

latch means for holding and outputting said polarity data generated by said polarity data generating means during a data read operation period of said memory control means corresponding to the horizontal scan period in which said polarity data was generated;

discrepancy detecting means for generating a discrepancy detection signal when discrepancy is detected between said polarity data read by said memory control means and polarity data held in said latch means;

color phase inverting means for relaying said image data read from said memory control means and, responsive to said discrepancy detection signal for inverting the color phase of said image data read from said memory control means and relaying said image data with the inverted color phase; and means for generating an analog video signal based on said image data output from said color phase inverting means.

* * * * *